May 16, 1967     H. F. BOGARDUS     3,319,401

REFILLABLE, LEAKPROOF GAS ADSORPTION UNIT

Filed Oct. 27, 1965     3 Sheets-Sheet 1

INVENTOR
HAROLD F. BOGARDUS

BY *Melvin L. Crane* AGENT

*R. S. Sciascia* ATTORNEY

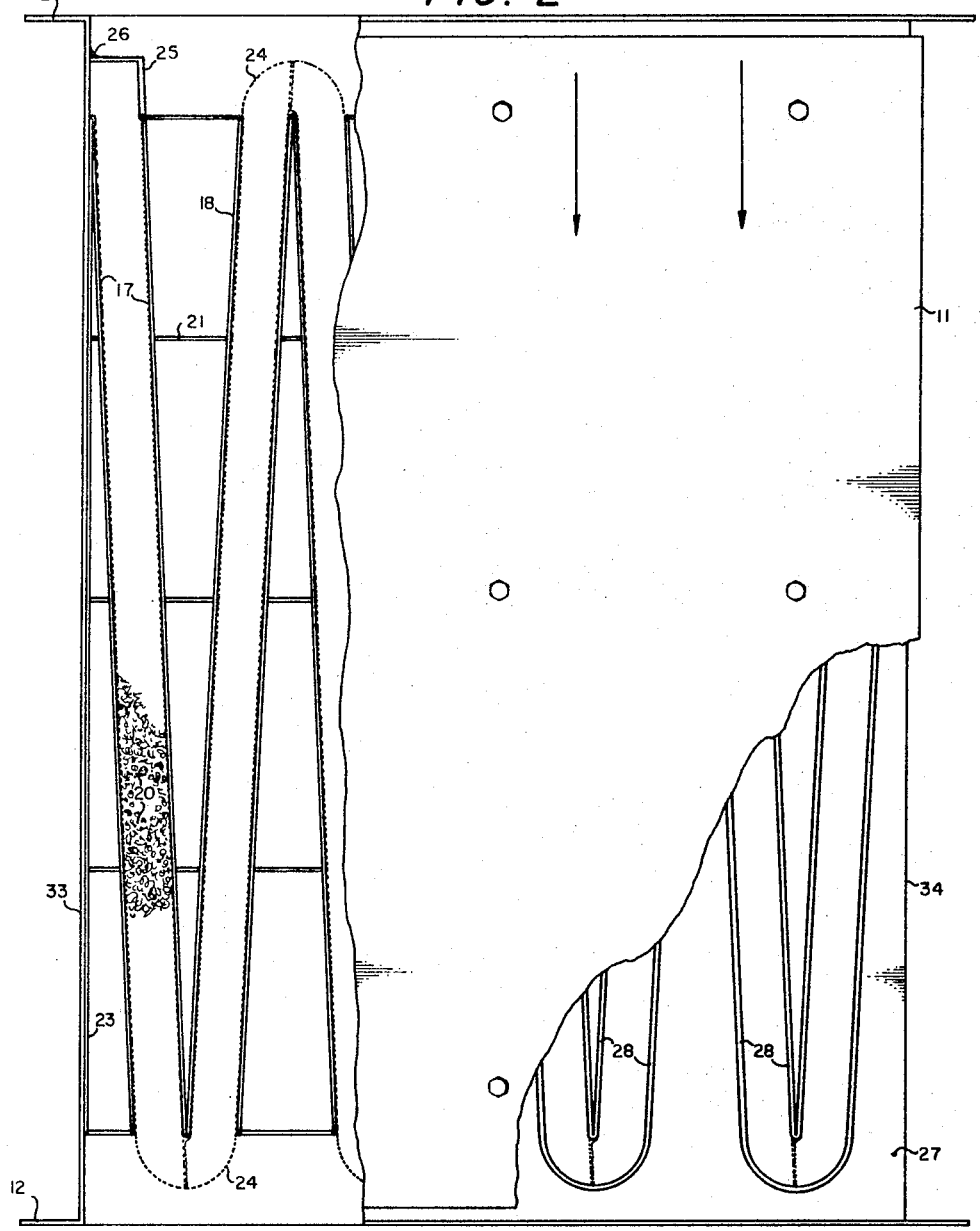

May 16, 1967     H. F. BOGARDUS     3,319,401
REFILLABLE, LEAKPROOF GAS ADSORPTION UNIT
Filed Oct. 27, 1965     3 Sheets-Sheet 3

INVENTOR
HAROLD F. BOGARDUS

BY *Melvin L Crow* AGENT
*R S ......* ATTORNEY

United States Patent Office 3,319,401
Patented May 16, 1967

3,319,401
REFILLABLE, LEAKPROOF GAS ADSORPTION UNIT
Harold F. Bogardus, Alexandria, Va., assignor to the United States of America as represented by the Secretary of the Navy
Filed Oct. 27, 1965, Ser. No. 505,437
1 Claim. (Cl. 55—387)

The present invention is directed to an air filter apparatus and more particularly to an air filter in which all air must pass through the filtering medium.

The efficiency of a filter device is limited by the effectiveness of methods used to prevent unfiltered air from bypassing the adsorbent medium and entering the clean space. Heretofore, prior art filter devices permitted unfiltered air to enter the clean space by air escaping through welds, gaskets, cemented joints or cracks which develop at the joints. It is very important to provide a filter in which one is assured of no leaks, especially where harmful gases are involved.

The filter device of the present invention avoids the drawbacks of the prior art and provides an efficient filter which will not permit any unfiltered air to pass into the clean space beyond the filter. The filter of the present invention also provides a filter device in which the filtering medium, or adsorption material may be quickly replaced without disconnecting the filter housing from the installation.

It is therefore an object of the present invention to provide an efficient economical leakproof filter unit.

Another object is to provide a leakproof filter unit which may be easily fabricated.

Still another object is to provide a filter unit which has very little obstruction to air flow due to structural supports.

Various other objects and advantages will appear from the following description of an embodiment of the invention, and the novel features will be particularly pointed out hereinafter in connection with the appended claim, wherein:

FIG. 2 is a top view partially cut away to illustrate features of the inner structure;

Figure 1:
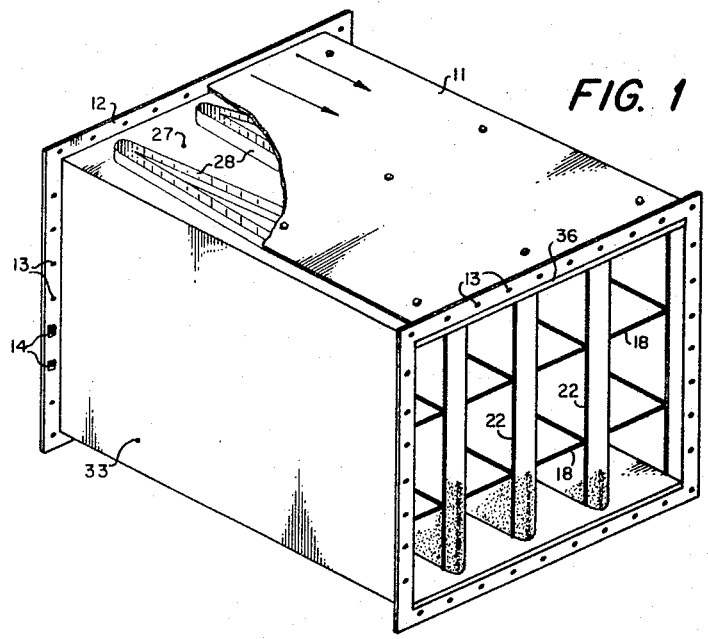
FIG. 1 is a perspective view partially cut away to illustrate some of the top features.

Now, referring to the drawings wherein like reference characters refer to like parts throughout, there is shown by illustration in FIG. 1 a filter unit made in accordance with the present invention. FIG. 1 has been cut away on the top plate 11 to illustrate some of the inner structure which is shown more clearly in FIG. 2. FIG. 2 is a partial cut-away view of the device illustrating the particular structure which makes the device operative to insure that no contaminated air will pass into the clean area.

The filter unit includes a housing which is formed from one single sheet of metal which is stamped into shape and then folded into a box-like form with open ends. The stamped sheet of metal is formed with ends 12 at 90° angle with the main portion to provide flanges which are used to connect the filter unit into an air system. After stamping, the sheet is formed into a box shape with the ends joined by brazing or by any other suitable means at a corner at the top or bottom. The ends or flanges 12 may be cut at the corners to aid in folding the sheet into the box-like form and then brazed after forming the box-like form for better support. The ends 12 are provided with apertures 13 and nuts 14 secured thereto at each aperture for the purpose of securing the device in a system. Any other bolt-nut arrangement may be used without departing from the invention. The flanges should be reinforced in order to provide sufficient strength for securing the filter unit in a system.

Figure 3:
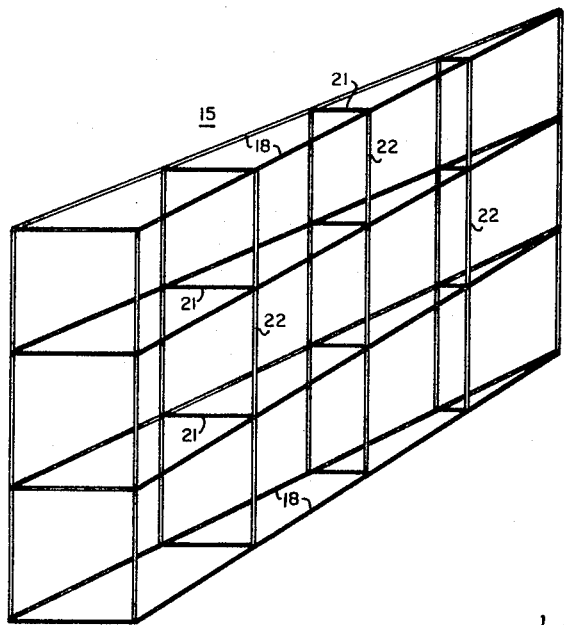
FIG. 3 is a support structure for the filter bed.
Figure 4:
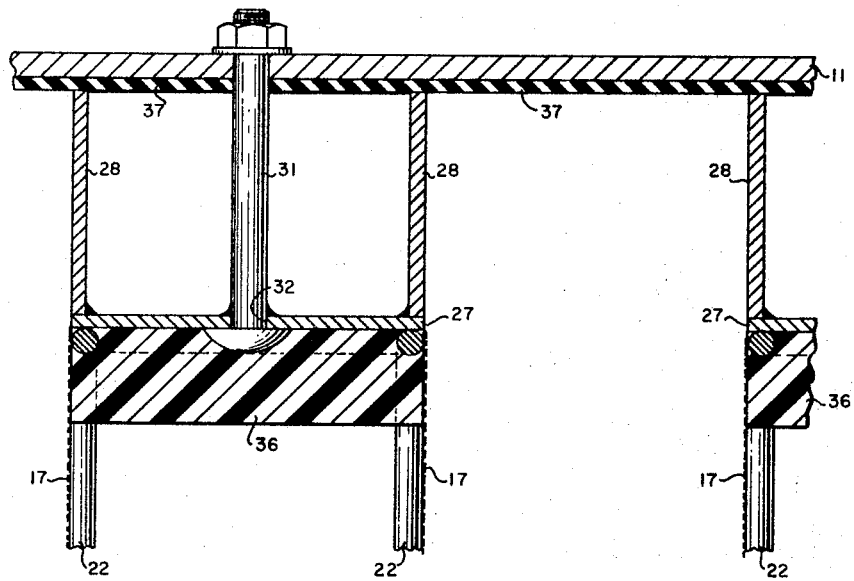
FIG. 4 is a partial section of the upper wall illustrating the filter bed extension and the sealant potting compound.
Figure 5:
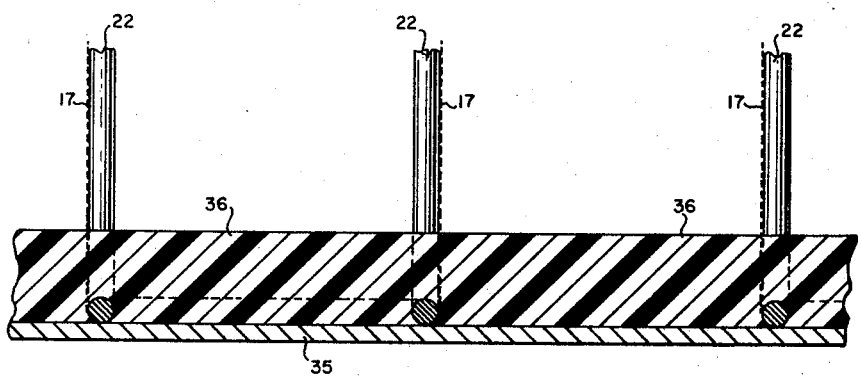
FIG. 5 is a partial sectional view of the bottom illustrating the support structure rods and the potting compound at the bottom of the housing.

In order to provide an effective filter bed which will not possibly pass any unfiltered air flow into a clean area, an adsorbent bed is formed, assembled and secured within the housing such that air must flow through adsorbent material. The filter bed is formed by a plurality of V-shaped supporting frames 15, each of which are formed of rods or stiff wire, about which perforated metal or a fine screen wire 17 is secured to hold the adsorbent material in place. Each supporting frame as shown in FIG. 3 may be made with parallel triangular or V-shaped forms 18, each of which have spaced horizontal supports 21. The parallel triangular forms 18 are secured in place by parallel vertical rods 22 or wires which are secured at each end of each of the triangular forms, spaced along the sides and secured at the horizontal supports 21 across each of the triangular forms. Thus, the structure is a relatively lightweight open frame with little obstruction to air flow. A plurality of such supports are assembled alternately with their vertex ends at opposite ends of the structure in spaced relationship such that the sides of adjacent supports are parallel to each other as shown in FIG. 2. The spacing between the supports in the final assembly becomes the thickness of the adsorbent material in the filter unit. Therefore, the spacing is dictated by the desired thickness of the adsorbent compartments. In order to insure that there will be no leakage of contaminated air and to end up with an assembly that provides an adsorbent bed at an angle with the axis of the housing with sufficient adsorbent material, two half-sized support frames 23 are made and assembled as the outermost support members for each side of the assembly. Since the illustrated structure is made with seven full-sized support frames, each of the half-width support frames is secured with its vertex end in the same direction, which is in the direction of the inlet, as shown in FIG. 2.

An appropriate perforated metal or fine mesh screen 17 is secured to the side of one of the half-width sections on the side away from the housing side and a separate piece is secured to the adjacent side of the full-sized support section. The two separate pieces of perforated metal or fine mesh screen are secured to the respective sides of the remainder of the support members with the perforated metal forming a semicircular path 24 from the end of one support section to the next support section. The piece of perforated metal that follows the support section to the vertex end extends beyond the vertex end to the semicircular piece that encircles the vertex end where the two are secured together. The structure is shown in the cut-away portion of FIG. 2.

The end of the outermost full-sized support structure closest to each of the housing walls adjacent to the apex end of each of the half-width support structures has a solid metal angle iron 25 secured thereto as shown in the cut-away section of FIG. 2. The angle iron could be formed as a U-shaped channel and secured to the outer end of the full-size support structure and also to the vertex end of the half-width support section. Such a structure would provide better support for the adsorption material holder. Upon assembly of the adsorption material holder or bed and placement into the housing, each of the angle irons are brazed or welded to the side wall of the housing adjacent thereto at 26. When using a U-shaped member, the side walls of the housing have a section cut therefrom and the side walls are then welded to the U-shaped member along the side wall.

The upper wall 27 of the housing is cut out to conform to the adsorption bed, so that the adsorption bed is in alignment therewith when the adsorption bed has been assembled and secured within the housing. The upper wall sections remaining between the adsorption bed areas has welded thereto upright walls 28 which act as extensions of the adsorption bed above the upper wall. These extensions provide an area so that the adsorption material can be extended above the housing to insure that contaminated air will not by-pass the adsorption material. Also, the above structure permits one to fill the adsorption bed and to remove contaminated adsorption material from the adsorption bed without disconnecting or removing the housing from the system when changing the adsorption material. In order to close the upper portion of each of the compartments that extends upwardly above the upper wall 27 of the housing, a solid plate 11 with suitably spaced bolt holes is secured over the upper wall extensions 28 and held in place by bolts 31. Each of the bolts are secured within an aperture 32 in the upper wall 27 with the bolt head below the wall and the bolt is secured in place to the top of the upper wall by welding the bolt to the upper wall.

Upon assembly of the adsorption bed and placement into the housing, the angle irons 25 on the ends of the adsorption bed are welded or brazed to the housing side walls 33 and 34 and the supporting V-shaped sections are secured to the bottom wall 35 by welding or any other suitable means. Since the housing is made of a single sheet of material and the adsorption bed extends fully across the width, length, and height of the housing, the only likely place for a leak is along the bottom and top. To avoid any leakage along the bottom or top, a layer of potting compound 36 is poured onto the bottom over the entire surface for a certain thickness. This ensures a seal on the bottom. The same thing is done to the top surface; however, in order to prevent the potting compound from covering the openings at the top wall or leaking into the open area, temporary dams of masking tape (not shown for simplification of the drawings) or some other suitable material is applied to the surface of the housing extension and onto the perforated metal forming the adsorption bed. The top side is then rotated to the bottom and the potting compound is poured and permitted to harden. Subsequently, the temporary dams may be removed.

To prevent any air leaks between the cover plate 11 and the upper wall extensions, a gasket 37 is used between the plate and the wall extensions. Any air escaping from between the upper plate and the wall extensions would have already passed through the adsorption material and would be clean air.

The only remaining area which could possibly leak is along the welds between the angle iron and the side walls. However, by observing FIG. 2 it is seen that the air would pass through adsorption material so it doesn't matter if a leak should occur along the weld joint.

In assembly of the filter device, the metal plate from which the housing is formed is stamped, to form the end connector surfaces. The box-like housing is then formed and the ends joined at one of the corners by brazing welding or any other suitable method. The top wall of the housing is cut out in the shape of the V-shaped support frame members and the wall extensions are secured along the cutouts. The top wall is also provided with apertures therein within which bolts are secured. The housing is now ready to receive the adsorbent bed. The filter adsorbent bed is then formed. In forming the adsorbent bed, the V-shaped frames are formed, assembled in alternate opposite end relationship and the perforated metal is secured thereto. The angle iron plates are then secured to the outermost full-sized V-shaped frame and if desired, a U-shaped channel is used and connected to the ends of the full-sized and half-width V-shaped support frames.

The filter bed is then slid into place in the housing. The angle iron members on each side are secured to the side walls by welding, brazing, or any other suitable means and the support frames are secured to the bottom to hold the adsorbent bed in the housing. The potting compound is then applied to the bottom and permitted to harden. As soon as the potting compound on the bottom has hardened, the upper wall is prepared to receive potting compound by forming dams in the adsorbent bed openings at the openings in the upper wall. The filter unit is then turned over with the top wall down and the potting compound is poured inside of the top wall. The potting compound is permitted to harden and the unit may be turned upright. The filter unit is now ready to receive the adsorbent material and be placed in a filter system or placed in a system and then the adsorbent material placed therein. After filling the adsorbent bed with the proper adsorbent material, the gasket material and top plate may be secured in place. The unit is now ready for filtering 100% of the air that passes through the filter unit.

In operation, a blower may be placed in the clean air area to draw air through the filter unit or the blower may be placed on the contaminated air side to force air through the filter unit. In any event, since the perforated metal sides of the filter bed may not be formed as a fine filter, a fine filter may be required in the clean air side to collect dust or small particles of adsorbent material that may pass through the perforated metal sides of the filter bed.

The filter bed made in accordance with this invention should not leak any contaminated air; however, in order to insure that no contaminated air enters a clean air space, the following steps may be taken. If the blower is placed downstream and forces air through the filter, then the filter unit should be placed on the outside of the room which is to receive clean filtered air. Thus, any air leaks between the duct work, the filter, and the room will leak back into the unclean air space. If the blower is upstream and pulling the air through the filter, then the filter should be placed within the clean air room. Thus, air will not leak from the filter but rather will be pulled into the filter from the clean room due to the pressure difference created by the pull of the blower and the surrounding room air. Since the filter unit is positioned within the clean air room, the air being pulled into the filter unit will be clean air. Also, the pressure within the filter unit is less than the surrounding room air. Therefore, contaminated air passing through the filter unit will not possibly leak into the clean air room due to the pressure difference.

It is well known that the filtering material may settle after a period of use. Therefore, the cover should be removed and additional filter material added to the top to insure that the air passes sufficient filter material.

In order to provide a truly refillable filter for long-lasting periods, the supporting frame and perforated metal or fine mesh screen must be of a material that will not corrode or be harmed otherwise in use. Therefore, the filter supporting frame and the perforated metal or fine mesh screen must be made of a metal compatible with the air to be filtered.

Obviously many modifications and variations of the present invention are possible in the light of the above teachings. It is therefore to be understood that within the scope of the appended claim the invention may be practiced otherwise than as specifically described.

What is claimed and desired to be secured by Letters Patent of the United States is:

A filter which comprises:
a housing,
a filter bed positioned within said housing,
said filter bed extending over the width, length, and height of said housing thereby preventing passage of any contaminated air therethrough, said filter bed including a plurality of spaced compartments joined at their ends for receiving a filter material in each compartment, said spaced compartments extending the length of said housing with a portion of each compartment extending beyond one wall of said housing and positioned between opposite walls of said housing at an angle relative to the axis through the length thereof, said filter bed being secured to the inner surface of the sides of said housing over their height for free flow of air between said compartments, a sealing compound sealing the spacing between each of said compartments of said filter bed at the top and bottom thereof within said housing, an opening into each of said spaced compartments for filling and removing filter material therefrom, and a cover for sealing said openings at the top of each of said compartments.

References Cited by the Examiner

UNITED STATES PATENTS

| | | | |
|---|---|---|---|
| 2,130,107 | 9/1938 | Somers | 55—502 X |
| 2,394,208 | 2/1946 | Schaaf | 55—502 X |
| 2,908,348 | 10/1959 | Rivers et al. | 55—502 X |
| 3,013,667 | 12/1961 | Jackson et al. | 55—497 X |
| 3,177,637 | 4/1965 | Davis | 55—497 X |
| 3,243,942 | 4/1966 | Burke | 55—387 |

FOREIGN PATENTS 975,974  11/1964  Great Britain.

REUBEN FRIEDMAN, *Primary Examiner.*

J. ADEE, *Assistant Examiner.*